United States Patent Office 3,475,441
Patented Oct. 28, 1969

3,475,441
1 - CHLORO - 3 - (2,3,5,6 - TETRACHLORO-
PYRID - 4 - YLSULFONYL) - PROPAN - 2-
OL AND INTERMEDIATE
Leonard Levine, Lake Jackson, Tex., assignor to The Dow Chemical Company, Midland, Mich., a corporation of Delaware
No Drawing. Filed June 13, 1968, Ser. No. 738,727
Int. Cl. C07d *31/50;* A01n *9/14*
U.S. Cl. 260—294.8     2 Claims

ABSTRACT OF THE DISCLOSURE

Disclosed is the new compound 1-chloro-3-(2,3,5,6-tetrachloropyrid-4-ylsulfonyl)-propan-2-ol which is useful as a pesticide. An intermediate for the production of this compound, 1-chloro-3-(2,3,5,6-tetrachloropyrid-4-ylthio)-propan-2-ol, is also disclosed.

---

The present invention relates to a novel and useful compound, 1 - chloro-3-(2,3,5,6-tetrachloropyrid-4-ylsulfonyl)-propan-2-ol. This compound is representable by the following Formula I.

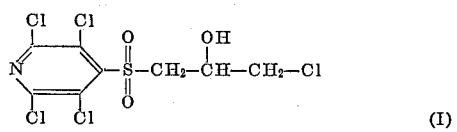

(I)

The subject compound hereof is a crystalline white solid at room temperature. It is useful as a pesticide for the control and kill of various organisms and particularly many insect, arachnid, and plant organisms, for example, worms, mites and certain terrestrial weeds and plants.

The present invention is also directed at a novel compound useful, interalia, as an intermediate for the production of the useful subject compound. This compound by name is 1-chloro-3-(2,3,5,6-tetrachloropyrid-4-ylthio)-propan-2-ol and is representable by the following Formula II.

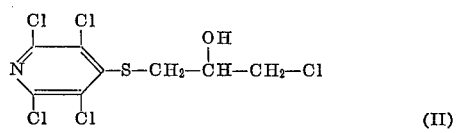

(II)

This compound is a yellow crystalline solid at room temperature. As mentioned, it is useful as an intermediate in the preparation of 1-chloro-3-(2,3,5,6-tetrachloropyrid-4-ylsulfonyl)-propan-2-ol and in addition, is a useful fungicide for the control and kill of a wide variety of fungal pest organisms.

1 - chloro - 3 - (2,3,5,6 - tetrachloropyrid - 4 - ylsulfonyl)-propan-2-ol (I) is prepared by oxidizing 1-chloro-3 - (2,3,5,6 - tetrachloropyrid - 4-ylthio)-propan-2-ol (II). This is accomplished by use of an oxidizing agent which include, representatively, hydrogen peroxide, benzol peroxide, peracetic acid, and perbenzoic acid. One molecular proportion of 1 - chloro-3-(2,3,5,6-tetrachloropyrid-4-ylthio)-propan-2-ol is reacted with an amount of oxidizing agent sufficient to supply at least two gram atoms of oxygen. In carrying out the various oxidation reactions to prepare the compound of the present invention, the oxidizing agent is employed in such amounts as will provide oxygen in at least the stoichiometric quantities consumed in the particular reaction. The use of an excess, upwards from about a 50 percent molar excess to about a 10 fold molar excess, of the oxidizing agent is preferred.

Hydrogen peroxide, and conveniently a solution thereof with glacial acetic acid or with formic acid, is the oxidizing agent of choice in the production of the 1-chloro-3 - (2,3,5,6 - tetrachloropyrid-4-ylsulfonyl)-propan-2-ol of the present invention. In a preferred procedure, the glacial acetic acid is employed as the liquid reaction medium for the oxidation with hydrogen peroxide. The reaction takes place at temperatures of from about 30° C. to about 100° C. In a convenient method, the reaction is carried out at between 40° and 80° C. In carrying out the reaction, the reactants are contacted in any order or fashion, and preferably in amounts at least stoichiometric for the preparation of the desired product. The reaction mixture is then maintained at a temperature within the reaction temperature range for a period of time sufficient to complete the reaction. Following the reaction period, the 1-chloro-3-(2,3,5,6-tetrachloropyrid-4-ylsulfonyl)-propan-2-ol product can be recovered by conventional evaporation of solvent and recrystallization of the resultant residue.

By employing similar procedures and reaction conditions as described above, benzoyl peroxide or perbenzoic acid can be employed to prepare the 1-chloro-3-(2,3,5,6-tetrachloropyrid-4-ylsulfonyl)-propan-2-ol hereof. In a preferred procedure, the oxidizing agent is employed in quantities in excess of the theoretical quantities consumed by the reaction in the preparation of the desired product. Conveniently, these reactions are conducted in a liquid medium, a solution of the ovidizing agent in, for example, benzene, chloroform, etc. being satisfactorily used as the transfer medium for this reactant to the reaction mixture.

The starting compound for this preparative procedure, 1 - chloro - 3 - (2,3,5,6 - tetrachloropyrid - 4 - ylthio)-propan-2-ol, is itself a novel compound possessing utility as an intermediate as herein described and, in addition, as a fungicide. This compound thus also represents a novel aspect of the present invention. It can be prepared by reacting together pentachloropyridine and 1-chloro-3-mercaptopropan-2-ol in the presence of base, such as sodium hydroxide, potassium hydroxide, sodium carbonate, potassium carbonate, ammonium hydroxide, tetramethylammonium hydroxide and the like.

This reaction is conveniently conducted in an inert, liquid reaction medium such as can be provided by ethanol, methanol, dimethylsulfoxide, or other polar, inert solvent which provides sufficient solubility for the employed base. In this reaction, the pentachloropyridine reactant and the 1-chloro-3-mercaptopropan-2-ol reactant and the employed base are consumed in substantially equimolecular amounts and the employment of such proportions or a slight excess of either or both of the pentachloropyridine and 1-chloro-3-mercaptopropan-2-ol reactants in comparison to the base is preferred. This reaction proceeds smoothly at temperatures of from 0° C. to the boiling point of the reaction mixture and conveniently at from room temperature to about 70° C. for from a few minutes to a few hours. Upon termination of the reaction, the appropriate product is recovered via conventional means.

In practicing the above reaction, the reactants and solvent are mixed together in any convenient fashion. In one manner, the pentachloropyridine and 1-chloro-3-mercaptopropan-2-ol are mixed with an inert solvent and to the resulting mixture is added the base in a further portion of solvent. The reaction mixture is thereafter preferably raised to the boiling point and maintained under reflux for a period sufficient to produce the product, usually ranging for a few minutes to several hours. Thereafter the reaction mixture is filtered and the filtrate cooled to initiate precipitation. The isolated precipitate is washed well with solvent and dried to give the product isolation.

The following examples are merely illustrative and are not intended to be limiting.

EXAMPLE 1

A solution of 15 grams (0.044 mole) of 1-chloro-3-(2,3,5,6-tetrachloropyrid-4-ylthio)-propan-2-ol is dispersed in 250 milliliters of glacial acetic acid at room temperature with stirring. To the resultant solution is added, dropwise, a solution of 20 grams of 30 percent aqueous hydrogen peroxide (0.18 mole of hydrogen peroxide). This addition is carried out at a rate such that the temperature of the reaction mixture does not exceed 65° C. After such addition, the reaction mixture is stirred at 55° to 65° C. for 5 hours. The mixture is then cooled to 30° C. and 10 grams of 30 percent hydrogen peroxide (0.09 mole of hydrogen peroxide) are added. The resultant mixture is then stirred at 45° to 50° C. overnight. At the end of this time, the solvent is removed from the reaction mixture in a rotary evaporator at a temperature of from 50° to 60° C. at a pressure of from 40 to 60 mm. Hg. The residue remaining after the evaporation is recrystallized from 60 percent aqueous ethanol. The resultant solid is dried in a vacuum oven to obtain the desired 1-chloro-3-(2,3,5,6-tetrachloropyrid-4-ylsulfonyl)-propan-2-ol product as a white solid melting at from 113° to 115° C. *Elemental analysis.*—Calculated for $C_8H_6Cl_5NO_3S$: N, 3.75. Found: N, 3.68.

EXAMPLE 2

1-chloro-3-(2,3,5,6-tetrachloropyrid-4-ylthio)-propan-2-ol (10 grams; 0.03 mole) is dispersed in 100 milliliters of glacial acetic acid. To the resultant solution is added with stirring and in a dropwise fashion a solution of 6.8 grams of 30 percent hydrogen peroxide (0.06 mole of hydrogen peroxide) which is dispersed in 25 milliliters of glacial acetic acid. The reaction mixture is stirred at 60° C. for about 6 hours. The mixture is then evaporated in vacuum and the remaining solid recrystallized from an aqueous ethanol mixture to give the desired 1-chloro-3-(2,3,5,6-tetrachloropyrid-4-ylsulfonyl)-propan-2-ol product.

EXAMPLE 3

Pentachloropyridine (156 grams; 0.62 mole) and 1-chloro-3-mercaptopropan-2-ol (78.5 grams; 0.62 mole) are dispersed in 600 milliliters of methanol at room temperature and with stirring. The temperature of the resultant solution is then raised to the boiling point and maintained under reflux with stirring while a solution of 23.2 grams (0.58 mole) of sodium hydroxide in 250 milliliters of methanol is added dropwise thereto over a period of 2.5 hours. After the addition is complete, the reaction mixture is allowed to cool to room temperature and is set aside overnight. After this time, the mixture is filtered to separate sodium chloride as a solid. The filtrate is cooled until precipitation begins and proceeds to completion. The resulting precipitated solid is collected by filtration and washed successively with methanol and water. The washed solid is dried to obtain the desired 1-chloro-3-(2,3,5,6-tetrachloropyrid-4-ylthio)-propan-2-ol product as a yellow solid melting at from 103° to 105° C. *Elemental analysis.*—Calculated for $C_8H_6Cl_5NOS$: N, 4.10; Cl, 52.0. Found: N, 4.06; Cl, 51.9.

A further portion of product is recovered as follows. The methanol filtrate remaining after filtration of precipitated solid in the above procedure is stripped of solvent in a rotary evaporator and the resultant solid residue is extracted several times with boiling chloroform. The combined chloroform extracts are then stripped of solvent in a rotary evaporator to obtain the 1-chloro-3-(2,3,5,6-tetrachloropyrid-4-ylthio)-propan-2-ol product which when recrystallized from 75 percent aqueous ethanol melts at from 104° to 106° C.

The new compounds (I) and (II) of the present invention are useful, respectively, as a pesticide and as a fungicide for the control of a number of insect, mite, plant, and fungal organisms. For such uses the unmodified compounds can be employed. The products can also be dispersed on a finely divided solid and employed as a dust. Also, such mixtures can be dispersed in water with or without the aid of a surface-active dispersing agent and the resulting aqueous suspension employed as a spray, drench, or wash. In other procedures, the products are employed as the toxic constituents in solvent solutions, oil-in-water or water-in-oil emulsions or aqueous dispersions. Good results are obtained when employing compositions containing pesticidal and fungicidal amounts of the compounds. These amounts range generally from 50 to 10,000 parts per million of one of the compounds.

In representative operations, 1-chloro-3-(2,3,5,6-tetrachloropyrid-4-ylsulfonyl)-propan-2-ol gives a substantially complete control and kill of the two-spotted spider mite when such mite is contacted with aqueous compositions containing the named compound as the sole toxicant at concentrations of 500 parts per million by weight.

In a further representative operations, 1-chloro-3-(2,3,5,6-tetrachloropyrid-4-ylsulfonyl)-propan-2-ol gives substantially complete controls and kills of spiny clotbur and crabgrass when such plants in post emergent growth stage are separately sprayed to run-off with compositions containing 5000 parts of the named compound per million by weight.

In still further operations, 1-chloro-3-(2,3,5,6-tetrachloropyrid-4-ylsulfonyl)-propan-2-ol gives substantially complete controls and kills of pigweed when the named compound is applied in pre-emergent applications to seed beds containing the seeds of the named plant specie at the rate of 10 pounds per acre.

In additional operations, 1-chloro-3-(2,3,5,6-tetrachloropyrid-4-ylthio) propan-2-ol when added, as the sole toxic constituent to the microbial growth medium at a concentration of 100 parts per million by weight, gives complete inhibition of the growth and kill of *Bacillus subtilis, Straphylococcus aureus, Trichophyton mentagrophytes, Candida albicans, Candida pelliculosa* and *Pullularia pullulans.*

In still additional operations, 1-chloro-3-(2,3,5,6-tetrachloropyrid-4-ylsulfonyl)-propan-2-ol when added, as the sole toxic constituent to the microbial growth medium at a concentration of 500 parts per million by weight, gives complete inhibition of the growth and kill of *Bacillus subtilis, Staphylococcus aureus, Trichophyton mentagrophytes, Mycobacterium phlei* and *Pullularia pullulans.*

What is claimed is:

1. 1-chloro-3-(2,3,5,6-tetrachloropyrid-4-ylsulfonyl)-propan-2-ol.

2. 1-chloro-3-(2,3,5,6-tetrachloropyrid-4-ylthio)-propan-2-ol.

References Cited

UNITED STATES PATENTS 3,296,272   1/1967   Johnston _____ 260—294.8

HENRY R. JILES, Primary Examiner

ALAN L. ROTMAN, Assistant Examiner

U.S. Cl. X.R.

71—94